United States Patent Office 2,935,518
Patented May 3, 1960

2,935,518

REACTION PRODUCTS OF TETRAHALOGENATED QUINOID COMPOUNDS AND TRISECONDARY ALKYL PHOSPHITES AND PROCESS OF MAKING SAME

Theodor Reetz, Webster Groves, Mo., assignor to Monsanto Chemical Company, St. Louis, Mo., a corporation of Delaware No Drawing. Application September 12, 1958
Serial No. 760,570

9 Claims. (Cl. 260—396)

This invention relates to a new class of compounds derived from the reaction of chlorinated quinones with secondary alkyl phosphites and the hydrogenated derivatives thereof.

In recent years the reaction of phosphites with chlorinated aldehydes and ketones, as well as chlorinated quinones, has been the subject of considerable investigation. At first it was believed that these reactions proceeded according to the Michaelis-Arbusov reaction [1] to form phosphonates as follows:

I.

$$CH_3C-CH_2Cl+P(OC_2H_5)_3 \rightarrow CH_3C-CH_2-PO(OC_2H_5)_2+C_2H_5Cl$$
$$\parallel \phantom{CH_3C-CH_2Cl+P(OC_2H_5)_3 \rightarrow CH_3C-CH_2-PO} \parallel$$
$$O \phantom{CH_3C-CH_2Cl+P(OC_2H_5)_3 \rightarrow CH_3C-CH_2-PO(OC_2}O$$

Later Perkov [2] discovered that the main product of the above reaction is not a phosphonate but a phosphate, thereby establishing that the Arbusov reaction was merely a side reaction as indicated by the fact that only 5–6 percent of the phosphonate was formed. Accordingly a new reaction was discovered which took place as follows:

II.

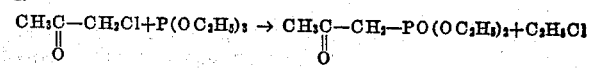

In the case of chlorinated quinones with which the present application is primarily concerned, the reaction with trialkyl phosphites [3] was also considered to be an Arbusov type reaction as follows:

III.

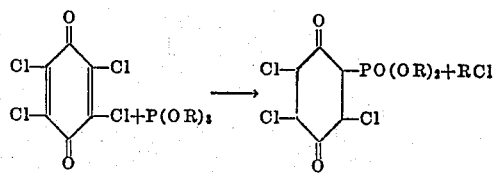

However, Ramirez [4] published some papers which established that Reaction III above with its formation of a phosphonate was not representative of the principal reaction which occurred but rather the reaction proceeded as follows:

IV.

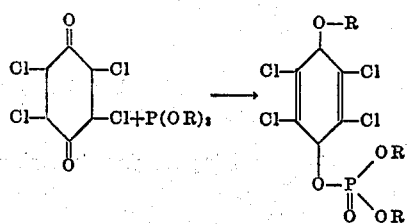

where R is ethyl.

[1] G. M. Kosolapoff, "Organophosphorus Compounds," 121, John Wiley, New York (1950).
[2] W. Perkov et al., Chem. Ber. 88, 662 (1955).
[3] E. C. Ladd, CA 47, 7540 (1953); also U.S. Patent 2,609,376.
[4] F. Ramirez, J. Org. Chem. 22, #865 (1957).

I have also found that the reaction took place as set forth in Equation IV and in addition have noted that phosphates were also formed when chloranil was reacted with trimethyl phosphite, tri-n-propyl phosphite, tri-n-butyl phosphite, tri-ethylhexyl phosphite, and tris-beta-chloroethylphosphite.

However, when chloranil was reacted with phosphites of secondary alcohols, I found that the reaction proceeded on the order of an Arbusov reaction but with the formation of a tetraphosphonate instead of a monophosphonate rather than in accordance with the teachings of Ramirez above in the following manner in the case of tri-isopropyl phosphite:

V.

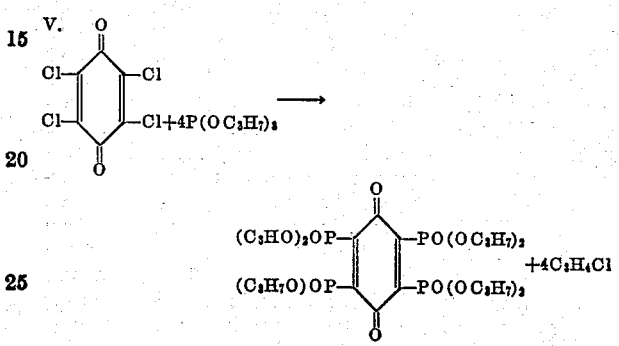

According to this invention, then, there has been discovered new compounds of the following structure:

VI.

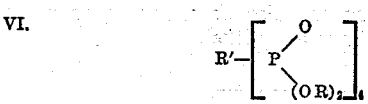

where R' is a member selected from the group consisting of quinone and hydroquinone and R is a secondary alkyl radical having from 3 to 6 carbon atoms.

The new compounds of this invention may be prepared by reacting chloranil with a tri-secondary alcohol phosphite preferably in the presence of a suitable solvent. Although the temperature at which the reaction takes place may be varied substantially depending at least in part on the particular phosphite used, temperatures of 75–125° C. are preferred. Actually the reaction may be conducted under temperature conditions ranging between 50–150° C. However, when the reaction temperature drops below 50° C. no tetraphosphonate can be detected as a product. Typical of the solvents which may be used are toluene, xylene and dioxane. In general any non-reactive solvent may be used which has a boiling point higher than the desired reaction temperature. The corresponding tetraphosphonate hydroquinone may be readily formed by hydrogenation with hydrazine or with hydrogen with palladium as a catalyst. However, reduction of the keto groups to hydroxy groups may be effected by any of the customary methods of reduction. It is to be noted that when a phosphite of a primary alcohol was used in Equation V above, no tetraphosphonate could be isolated or even detected.

The tetraphosphonates of this invention find utility as fuel additives and particularly for inhibiting preignition in gasoline used in internal combustion engines. The hydroquinone tetraphosphonates are also useful as a fuel marker due to their fluorescent properties.

The invention is illustrated in greater detail by the following examples:

EXAMPLE I

*p*-Quinone tetrakis (diisopropyl tetraphosphonate)

There is added over a period of 1½ hours, 54.1 g. tri-isopropyl phosphite (0.26 mole) to a stirred suspension of 24.6 g. chloranil (0.1 mole) in 50 ml. toluene in a suitable reaction container while maintaining the temperature between 105–110° C. After addition of the phosphite the temperature is maintained at 105–110° C. for an additional one-half hour and then cooled to 75° C. The solvent and any low boiler formed during the reaction are then distilled off under reduced pressure. At the conclusion of this step the pressure is approximately 20 mm. Hg and the temperature of the reaction vessel is 100° C. By crystallization there is obtained 14.6 g. of yellow p-quinone tetrakis (diisopropyl tetraphosphonate). M.P. 154.5–155° C.

EXAMPLE II

*p-Hydroquinone tetrakis (diisopropyl phosphonate)*

There is dissolved in 110 ml. ethanol, 38.25 g. of the product of Example I. The resulting solution is placed with palladium catalyst in a hydrogenation apparatus which is air evacuated and then purged with hydrogen. The hydrogenation is then placed under 60 lbs. of hydrogen for a period of 5 minutes at 35° C. at which the pressure dropped 4 lbs., indicating the acceptance of 0.05 mole of hydrogen by the compound undergoing reduction. The temperature is then maintained at 35–40° C. for an additional 2 hours, but no further pressure drop is observed. The hydrogen gas is then released and the reaction mixture filtered to remove the palladium. Water is added to the remaining alcoholic solution causing fluorescent pale green crystals to precipitate. These crystals are then further recrystallized from an ethanol water solution to give p-hydroquinone tetrakis (di-isopropyl phosphonate). Yield 84.0 percent.

The above reduction can also be effected with other catalysts such as platinum and nickel.

EXAMPLE III

*a. p-Quinone tetrakis (di-sec. butyl phosphonate)*

By employing the same procedure as set forth in Example I but substituting 54.9 g. tri-sec. butyl phosphite (0.219 mole) for the tri-isopropyl phosphite, there is obtained p-quinone tetrakis (di-sec. butyl phosphonate).

*b. p-Hydroquinone tetrakis (di-sec. butyl phosphonate)*

The product from Example III(a) above is then dissolved in 500 ml. hexane and 2 g. hydrazine are added. An oily precipitate forms and the mixture is diluted further with an additional 500 ml. hexane. The oily material is now separated and discarded. The remaining hexane solution is reduced in volume to 400 ml. by distillation. The solution is then cooled to −70° C. and 5.7 g. p-hydroquinone tetrakis (di.-sec. butyl phosphonate) precipitate as pale yellow-green crystals which show strong fluorescent properties. M.P. 120–121° C.

EXAMPLE IV

*p-Quinone tetrakis (di-2-methyl-pentanyl-4-phosphonate)*

By employing the same procedure as set forth in Example I but substituting 83.5 (0.25 mole) tri-2-methyl-pentanyl-4-phosphite, p-quinone tetrakis (di-2-methyl-pentanyl-4-phosphonate) is obtained.

While there have been described various embodiments of the invention, the methods and compounds described are not intended to be understood as limiting the scope of the invention as it is realized that changes therewithin are possible. Moreover, it is further intended that each element recited in any of the following claims is to be understood as referring to all equivalent elements for accomplishing the same result in substantially the same or equivalent manner, it being intended to cover the invention broadly in whatever form its principles may be utilized.

What is claimed is:

1. Compounds of the structure

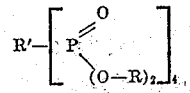

where R is a secondary alkyl having from 3 to 6 carbon atoms and R' is a member selected from the group consisting of quinone and hydroquinone wherein each of the four ortho and meta positions is substituted with an alkyl phosphonate radical of the structure as shown enclosed in the above brackets.

2. p-Quinone tetrakis (diisopropyl phosphonate).
3. p-Hydroquinone tetrakis (diisopropyl phosphonate).
4. p-Quinone tetrakis (di-sec. butyl phosphonate).
5. p-Hydroquinone tetrakis (di-sec. butyl phosphonate).
6. p-Quinone tetrakis (di-2-methyl-pentanyl-4-phosphonate).

7. The method of preparing compounds having the following structure

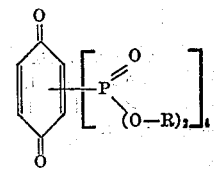

where R is a secondary alkyl having from 3 to 6 carbon atoms which comprises reacting a tri-secondary alkyl phosphite with a compound of the following structure

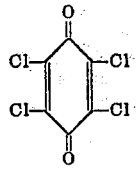

at a temperature of at least 50° C.

8. The method of preparing compounds having the following structure

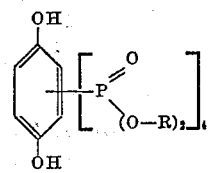

where R is a secondary alkyl having from 3 to 6 carbon atoms which comprises reacting a tri-secondary alkyl phosphite with a compound of the following structure

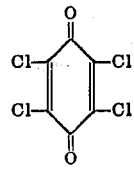

at a temperature of at least 50° C. and thereafter hydrogenating said quinone to the corresponding hydroquinone.

9. The method of preparing compounds having the following structure

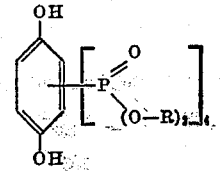

where R is a secondary alkyl having from 3 to 6 carbon atoms which comprises reacting a tri-secondary alkyl phosphite with chloranil at a temperature of at least 50° C. to form a quinone tetrakis (di-sec.-arylalkyl tetraphosphonate) and thereafter hydrogenating said quinone to the corresponding hydroquinone.

References Cited in the file of this patent

UNITED STATES PATENTS

| | | |
|---|---|---|
| 2,553,417 | Ladd et al. | May 15, 1951 |
| 2,609,376 | Ladd et al. | Sept. 2, 1952 |

FOREIGN PATENTS

| | | |
|---|---|---|
| 503,085 | Canada | May 25, 1954 |

UNITED STATES PATENT OFFICE

CERTIFICATE OF CORRECTION

Patent No. 2,935,518　　　　　　　　　　　　　　May 3, 1960

Theodor Reetz

It is hereby certified that error appears in the printed specification of the above numbered patent requiring correction and that the said Letters Patent should read as corrected below.

Column 3, line 62, after "83.5" insert -- g. --.

Signed and sealed this 11th day of October 1960.

(SEAL)
Attest:
KARL H. AXLINE
Attesting Officer

ROBERT C. WATSON
Commissioner of Patents